Feb. 7, 1956    A. WETTSTEIN ET AL    2,734,015
PROCESS FOR THE MANUFACTURE OF HYDROLYZED ADRENOCORTICOTROPHIN
Filed June 25, 1951
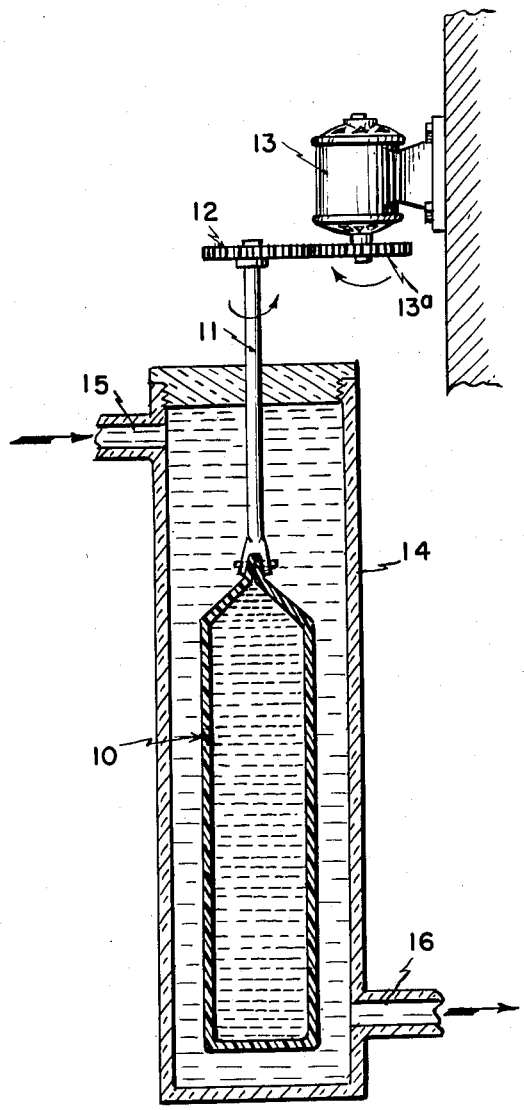
INVENTORS
Albert Wettstein and
Fritz Benz
BY Henderoth, Lind & Ponack
ATTORNEYS

2,734,015

PROCESS FOR THE MANUFACTURE OF HYDROLYZED ADRENOCORTICOTROPHIN

Albert Wettstein, Basel, and Fritz Benz, Binningen, Switzerland, assignors to Ciba Pharmaceutical Products, Inc., Summit, N. J.

Application June 25, 1951, Serial No. 233,304

Claims priority, application Switzerland June 30, 1950

7 Claims. (Cl. 167—74)

This invention relates to a new process for the production of biologically active cleavage products of the adrenocorticotropic hormone. Such preparations are valuable medicaments, as for example in the treatment of rheumatoid arthritis. For their therapeutic application it is however of the greatest importance that they should be as free as possible from other constituents, especially from high molecular degradation products.

Li, Evans and Simpson have first indicated, in the Journal of Biological Chemistry, vol. 149 (1943), page 413, the possibility of producing by careful proteolytic hydrolysis biologically active degradation products of the adrenocorticotropic hormone. These workers allowed pepsin or trypsin preparations to act for a short time on a physically homogeneous, pure preparation of the adrenocortiocotropic hormone obtained from sheep pituitary glands. At the required moment the enzyme action was interrupted by heating the reaction solution. As a result of this operation the preparations obtained showed the same biological activity as the starting material, when in the proteolysis with pepsin not more than 36–37 per cent. and with trypsin not more than 16–18 per cent. of the protein-like hormone was degraded. A more prolonged action of the proteolytic enzymes on the other hand led to a complete inactivation of the hormone preparation. Thus such a preparation had already become ineffective when 26 per cent. of the protein had been degraded by the action of trypsin. According to a later publication, Li partially hydrolyzed preparations from sheep pituitaries by a method analogous to that given above (Josiah Macy, Jr. Foundation, Transactions of the Seventeenth Meeting, Conference of Metabolic Aspects of Convalescence, New York, N. Y., 1948, page 114). From the solution obtained, the high molecular constituents and added enzymes were then removed by precipitation with trichloracetic acid. Similar cleavage products have been obtained, according to a communication in the journal of the American Chemical Society, vol. 72 (1950), page 1040, Brink, Meisinger and Folkers, by pepsin hydrolysis of a preparation of the adrenocorticotropic hormone from pig pituitaries. In that case the action of the enzyme was interrupted by dilution and the reaction solution subsequently dialysed against distilled water.

A primary object of the present invention is the embodiment of a process for the manufacture of biologically active products by the hydrolytic splitting of the adrenocorticotropic hormone wherein undesired extensive degradation of the formed active cleavage products is avoided so that the latter, as obtained, are in a high state of purity and in enhanced yield.

This object, as well as others which will hereinafter be evident, is achieved by the present invention according to which the hydrolytic splitting is carried out in such manner that, simultaneously with the hydrolysis, the reaction solution is dialysed and the cleavage products isolated from the dialysate.

For the hydrolytic splitting any suitable materials containing the adrenocorticotropic hormone for example of the anterior lobe of the pituitary gland can be used; however, it is advantageous to employ preparations which are as pure and homogeneous as possible. The hydrolytic splitting is carried out especially with proteolytic enzymes such as pepsin or trypsin. It can, however, also be carried out with other hydrolyzing agents as e. g. with mineral acids, such as dilute hydrochloric acid. The dialysis is carried out in the usual manner. It is advantageous to proceed in such a manner that the external liquid has approximately the same composition as the internal liquid. If, for example, the adrenocorticotropic hormone is split with an enzyme, such as pepsin, in acid solution, it should be dialysed against a solution having an equal concentration of acid. The external liquid may also be of different composition as long as hydrolysis and dialysis are not thereby prevented. As semi-permeable membranes for use between the two solutions, it is advantageous to employ such as are only permeable to low molecular peptides. The shape and size of the semi-permeable membrane is so selected that the dialysis is as effective as possible so that a rapid removal of the active cleavage products of the adrenocorticotropic hormone which are produced, from the reaction medium is ensured. Advantageously the external liquid is continuously replaced. A special method of operation involves the use, as hydrolysis vessel, of a long narrow tube of semi-permeable material. This is rinsed off, if desired while in movement, by means of the external liquid applied in the form of a flowing thin layer, for example in a tube of corresponding diameter. The recovery of the active cleavage products from the dialysate takes place in the customary manner. Advantageously the solution is lyophilised, that is to say frozen and the solvent evaporated in vacuum. Other forms of dialysis apparatus may also be used.

The new process avoids unduly far-reaching degradation of the active cleavage products of the adrenocorticotropic hormone produced, owing to the fact that it removes these from the reaction medium immediately after their formation. By this means it is possible in a simple manner to split practically the total quantity of the adrenocorticotropic hormone and to obtain a correspondingly high yield of cleavage products.

A presently-preferred embodiment of apparatus for use in carrying out the present invention is shown, by way of illustration, on the accompanying drawing, the single figure of which is a diagrammatic representation, partly in section, of such apparatus.

A solution of the crude material to be hydrolytically split, and also including the hydrolysing agent, is contained in the long, narrow, thin-walled dialysing tube 10 made of "Cellophane" which is then sealed. Alternatively the tube may be of other suitable semipermeable material, such as suitably prepared animal or vegetable materials, such as other cellulose derivatives, e. g. collodion, or parchment or suitable plastic material. Tube 10 may also be made of solid porous material such as diaphragm of clay or sintered glass coated with a semi-permeable material, such as collodion.

A supporting shaft 11 depends from gear 12, which is rotated by means of motor 13 and gear 13a. Tube 10 is fastened to shaft 11 in any suitable and/or conventional manner, whereby rotation of gear 12 rotates both shaft 11 and tube 10. The latter is positioned in a straight vertical cylinder 14 of glass or the like, the inner diameter of which is only slightly larger than the diameter of the filled tube 10. Tube 10 is constantly rotated during the simultaneous hydrolysing and dialysing operation, the outer surface of the tube being constantly laved by the thin layer of external liquid flowing through the thin cylindrical space defined between tube 10 and cylindrical space defined between tube 10 and cylinder 14. The external liquid is supplied at 15 and leaves at 16 together with entrained dialysate, for further treatment.

The invention is further exemplified in the following examples, the relation between parts by weight and parts by volume being the same as that between the kilogram and the liter. Percentages are by weight.

Example 1

5 parts by weight of a preparation of the adrenocorticotropic hormone from pig pituitaries, prepared according to the method of Fishman [Journal of Biological Chemistry, vol. 167 (1947), page 425], are dissolved in 1000 parts by volume of a solution of 0.5 part by weight of pepsin in 0.05–N hydrochloric acid and the solution introduced into a thin-walled dialysis tube, the surface of which is as large as possible in proportion to its volume. The dialysis tube is then inserted into a dialysis vessel charged with 10,000 parts by volume of 0.05–N hydrochloric acid which is maintained at 37° C. and the well stirred external liquid is syphoned off every 30 minutes and replaced by the same quantity of 0.05–N hydrochloric acid previously heated to 37° C. The fractions of the external liquid which are syphoned off and which contain the low molecular, active cleavage products of the hormone, are immediately lyophilised, and the dry residues weighed and tested by the ascorbic acid lowering test of Sayers, Sayers and Woodbury for adrenocorticotropic hormone activity. The colorless products first dialysed exhibit only a small biological activity; the dialysates subsequently obtained give yellow-colored dry residues which possess the same activity as the preparation which has been subjected to hydrolysis. The colorless dry products isolated from the final dialysates again show only small activity.

Instead of with pepsin and hydrochloric acid the hydrolysis can also be carried out with trypsin under suitable conditions, or with other hydrolysing agents, such as acids of higher concentration alone.

Example 2

A concentrated solution of the crude extract of the adrenocorticotropic hormone, containing 20 parts by weight of an acid 80% acetone extract of the isolated anterior lobe of whale pituitaries is dissolved in 400 parts by volume of a solution, cooled to 0° C., of 1 part by weight of pepsin in 0.05–N HCl, saturated with toluene. This solution is filled into a dialysing tube 10 of "Cellophane" (see accompanying drawing) and the filled tube placed into a suitable dialysing apparatus, preheated to the optimum hydrolysing temperature of 37° C. The external liquid advantageously has the same concentration of hydrochloric acid as the liquid in the dialysing tube. However, the composition of the external liquid may be different if hydrolysis and dialysis are not thereby prevented. The apparatus preferably consists, as illustrated, essentially of cylinder 14, adapted to the length of the tube and having an inner diameter only slightly greater than the diameter of the filled tube. The dialysing tube rotates in the manner previously described throughout the simultaneous hydrolysing and dialysing operation. From the external solution which flows off continuously at 16, the dialysed material is isolated by freezing and evaporation of the frozen solvent under reduced pressure.

The flow of the external liquid is regulated during the run so that 20,000 parts by volume of fresh solution are supplied to and pass through the cylinder 14 in the course of 3 hours and carry the dialysed material off. The dialysate thus obtained, containing the lower molecular cleavage products of the adrenocorticotropic hormone, leaves as residue after evaporation of the solvent 13 parts by weight of a readily water-soluble product which has a bluish tinge due to the presence of pigments.

The biological activity of the said water-soluble product, as determined by the ascorbic acid lowering test, is identical with that of the crude extract before hydrolysis.

Upon completion of the run (3 hours), the reaction is interrupted for the purpose of adding another part by weight of pepsin and the hydrolysis then continued under the same conditions. In the course of 2 hours there can thus be obtained from 16,000 parts by volume of liquor that have passed the tube another 3 parts by weight of dialysed material having the same biological activity.

Example 3

20 parts by weight of a preparation obtained from whole sheep pituitaries, the so-called "crude prolactin," are subjected to simultaneous hydrolysis and dialysis in the same proportions by weight and by volume and applying the same conditions as in Example 2.

From the 24,000 parts by volume of external liquid obtained after three hours, there are isolated 12 parts by weight of low molecular cleavage products of the adrencorticotropic hormone in the form of a whitish powder. Its biological activity is half that of the crude hormone before hydrolysis. By continuing the hydrolysis under the same conditions, except for another addition of 1 part by weight of pepsin, there can be obtained after two more hours another 2 parts by weight of a dialysate of the same activity. An examination of the internal solution shows that it still has about 10 per cent of its original activity and can therefore be exploited further to give more of the active dialysate.

Having thus disclosed the invention, what is claimed is:

1. A process for the in vitro manufacture of biologically active preparations of hydrolyzed adrenocorticotropic hormone complex, comprising the steps of subjecting a liquid containing the protein adrenocorticotropic hormone to the action of a proteolytic enzyme in a hydrolyzing zone circumscribed by an external liquid, with interposition between said zone and said external liquid of a dialytic membrane, whereby the liquid in said hydrolyzing zone constitutes the internal liquid, and simultaneously dialyzing said internal liquid through said dialytic membrane into the external liquid, and then isolating the obtained hydrolyzed products from the dialysate.

2. A process according to claim 1, wherein the dialytic membrane is a cellophane membrane.

3. Process according to claim 1, wherein the dialysate is lyophilised to obtain the cleavage products.

4. Process according to claim 1, wherein the external liquid is adjusted to the same acid strength as the internal liquid.

5. Process according to claim 4, wherein the external liquid is continuously renewed.

6. Process according to claim 1, wherein the hydrolysing zone is a long narrow cylindrical zone.

7. Process according to claim 6, wherein the outer surface of said semi-permeable material is rinsed off by means of the external liquid in the form of a thin running layer.

References Cited in the file of this patent

Recent Progress in Hormone Research, vol. VII, article by Dedman et al., pgs. 59 to 73, also pg. 39 (1952).

Li: Transactions Conf. Metabolic Aspects of Convalescents, vol. 17, pgs. 114 to 138. Pgs. 114 to 121 are especially pertinent (1948).

Fevold et al.: Article in Endocrinology, June 1940, pgs. 999 to 1004.

Neufeld: Article in Proc. Soc. Exp. Biol. Med., October 1943, pgs. 90 to 92.

McShan et al.: Article in J. Biol. Chem., November 1943, pgs. 259 and 266.

Tyslowitz: Article in Science, Sept. 3, 1943, pgs. 225 and 226.

White: Article in Physiological Reviews, October 1946, pgs. 574 to 608. Page 586 is especially pertinent.

Payne et al.: Article in J. Biol. Chem., vol. 187, No. 2, pgs. 719 to 731. Pgs. 720 to 722 are especially pertinent.